United States Patent
Ascough et al.

(10) Patent No.: US 10,151,846 B2
(45) Date of Patent: Dec. 11, 2018

(54) SEISMIC MODELING SYSTEM PROVIDING SEISMIC SURVEY DATA FREQUENCY DOMAIN INPAINTING AND RELATED METHODS

(71) Applicant: HARRIS CORPORATION, Melbourne, FL (US)

(72) Inventors: Jessica L. Ascough, Melbourne, FL (US); Mark D. Rahmes, Melbourne, FL (US); Mark E. Blue, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 353 days.

(21) Appl. No.: 15/054,289

(22) Filed: Feb. 26, 2016

(65) Prior Publication Data
US 2017/0248709 A1 Aug. 31, 2017

(51) Int. Cl.
*G01V 1/00* (2006.01)
*G06F 17/11* (2006.01)
*G06T 5/00* (2006.01)

(52) U.S. Cl.
CPC .............. *G01V 1/00* (2013.01); *G06F 17/11* (2013.01); *G06T 5/005* (2013.01); *G06T 2207/20056* (2013.01); *G06T 2207/30181* (2013.01)

(58) Field of Classification Search
USPC ............................. 703/2, 5, 22; 382/100, 109
See application file for complete search history.

(56) References Cited

U.S. PATENT DOCUMENTS

| | | | |
|---|---|---|---|
| 6,665,618 B1 | 12/2003 | Thomas et al. | |
| 7,391,899 B2 | 6/2008 | Rahmes et al. | |
| 7,528,938 B2 | 5/2009 | Garceau et al. | |
| 7,603,208 B2 | 10/2009 | Garceau et al. | |
| 7,750,902 B2 | 7/2010 | Rahmes et al. | |
| 7,760,913 B2 * | 7/2010 | Rahmes | G06T 17/05 382/100 |
| 7,764,810 B2 | 7/2010 | Rahmes et al. | |

(Continued)

OTHER PUBLICATIONS

Chang et al., "Application of inpainting technology to video restoration", UBI-Media Computing, IEEE, Jul. 2008, pp. 359-364.
(Continued)

*Primary Examiner* — Thai Q Phan
(74) *Attorney, Agent, or Firm* — Allen, Dyer, Doppelt + Gilchrist, P.A.

(57) ABSTRACT

A seismic modeling system may include a seismic model data storage device, and a processor cooperating with the seismic model data storage device to transform a seismic model spatial domain data set associated with a given region into a seismic frequency domain data set, where the given region includes a suspect region, transform a seismic model spatial domain data subset associated with the suspect region into a seismic frequency domain data subset, and perform inpainting of the seismic frequency domain data subset based upon the seismic frequency domain data set. The processor may further convert the inpainted seismic frequency domain data subset into an inpainted spatial domain data subset, and substitute the inpainted spatial domain data subset for the seismic model spatial domain data subset associated with the suspect region in the seismic model spatial domain data set associated with the given region.

26 Claims, 16 Drawing Sheets

(56) References Cited

U.S. PATENT DOCUMENTS

| | | | |
|---|---|---|---|
| 7,881,913 B2 | 2/2011 | Smith et al. | |
| 8,239,175 B2 | 8/2012 | Wivell et al. | |
| 8,855,427 B2 | 10/2014 | Yates et al. | |
| 2008/0019571 A1* | 1/2008 | Rahmes | G06T 5/005 382/109 |
| 2008/0080752 A1 | 4/2008 | Rahmes et al. | |
| 2011/0144962 A1 | 6/2011 | Blask et al. | |
| 2016/0252651 A1* | 9/2016 | Ellmauthaler | G01V 1/40 356/72 |
| 2016/0259075 A1 | 9/2016 | Tyagi et al. | |
| 2016/0342569 A1* | 11/2016 | Al Marzouqi | G06F 17/148 |
| 2017/0248709 A1* | 8/2017 | Ascough | G01V 1/00 |
| 2017/0248712 A1* | 8/2017 | Ascough | G01V 1/282 |
| 2017/0337675 A1 | 11/2017 | Gelman et al. | |

OTHER PUBLICATIONS

Criminisi et al., "Object removal by exemplar-based inpainting", IEEE Computer Vision and Pattern Recognition, Jun. 2003, pp. 1-8.

Perez et al., "Poisson image editing", Microsoft Research UK, 2003, pp. 313-318.

Rickett et al., "Cross-equalization data processing for time-lapse seismic reservoir monitoring: A case study from the Gulf of Mexico", Geophysics, Society of Exploration Geophysicists, vol. 66, No. 4, Jul. 2001, pp. 1015-1025.

Knapp et al. Imaging through gas clouds: a case history from the Gulf of Mexico: http://csegrecorder.com/articles/view/imaging-through-gas-clouds-a-case-history-from-the-gulf-of-mexico CSEG Recorder Apr. 2002. vol. 27, No. 3: pp. 5.

Ahmad Riza Ghazali "True-amplitude seismic imaging beneath gas clouds" A.R. Ghazali, Laboratory of Acoustical Imaging and Sound Control, Faculty of Applied sciences, Delft University of Technology, Delft, The Netherlands: 2011; pp. 157.

Yates et al. "Void fill accuracy measurment and prediction using linear regression" ASPRS 2012 Annual Conference, Sacramento, CA; Mar. 19-23, 2012; pp. 8.

Hope et al. "Seismic integration to reduce risk" Oilfield Review. Autumn 1998; pp. 14.

Rusakoff et al. "Image Similarity Using Mutual Information of Regions", Proceedings of the 8th European Conference on Computer Vision (ECCV), LNCS 3023, May 2004, pp. 596-607.

Peng et al. "Feature selection based on mutual information: criteria of max-dependency, max-relevance, and min-redundancy," IEEE Transactions on Pattern Analysis and Machine Intelligence, vol. 27, No. 8, pp. 1226-1238, 2005.

Matan Gavish, "A Crash Course on Shannon's Mutual Information for Categorical data Analysis", Jan. 7, 2011. pp. 12.

Paul A. Viola "Alignment by Maximization of Mutual Information" Technical Report 1548 Int. J. Comp. Vis. 24(2), 137-154 (1997).

Martha Catharina Maria Rijken "Modeling Naturally Fractured Reservoirs from Experimental Rock Mechanics to Flow Simulation", Ph.D. Dissertation, University of Texas at Austin, 2005; pp. 275.

Rasheed Olushehun Bello "Rate Transient Analysis in Shale Gas Reservoirs with Transient Linear Behavior", Ph.D. Dissertation, Texas A&M University, 2009; pp. 190.

http://www.tgs.com/products-and-services/retrieved from internet Mar. 4, 2016. pp. 1.

http://www.tgs.com/MEDIA-AND-EVENTS/TECHNICAL-PAPERS/ retrieved from Internet Mar. 4, 2016. pp. 17.

http://www.mathworks.com/matlabcentral/fileexchange/15674-seislab-3-01. pp. 1.

http://www.arcis.com/PAGES/LANDPROCESSING.ASP; 1pg. retrieved from internet Mar. 4, 2016.

U.S. Appl. No. 15/054,302, filed Feb. 26, 2016.

U.S. Appl. No. 15/054,328, filed Feb. 26, 2016.

Assous et al., "Microresistivity borehole image inpainting", Geophysics, vol. 79, No. 2, Apr. 2014, pp. D31-D-39.

Schonewille et al., "Matching pursuit Fourier interpolation using priors derived from a second data set", SEG Houston 2013 Annual Meeting, 2013, pp. 3651-3655.

Hauser et al., "Seismic data reconstruction via shearlet-regularized directional inpainting", May 2015, pp. 1-17.

* cited by examiner

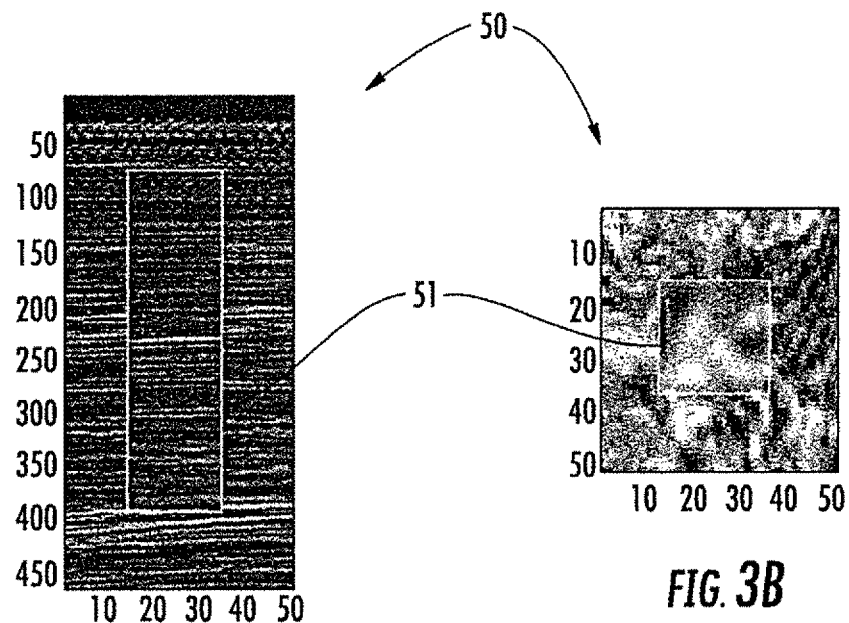
FIG. 3A
FIG. 3B
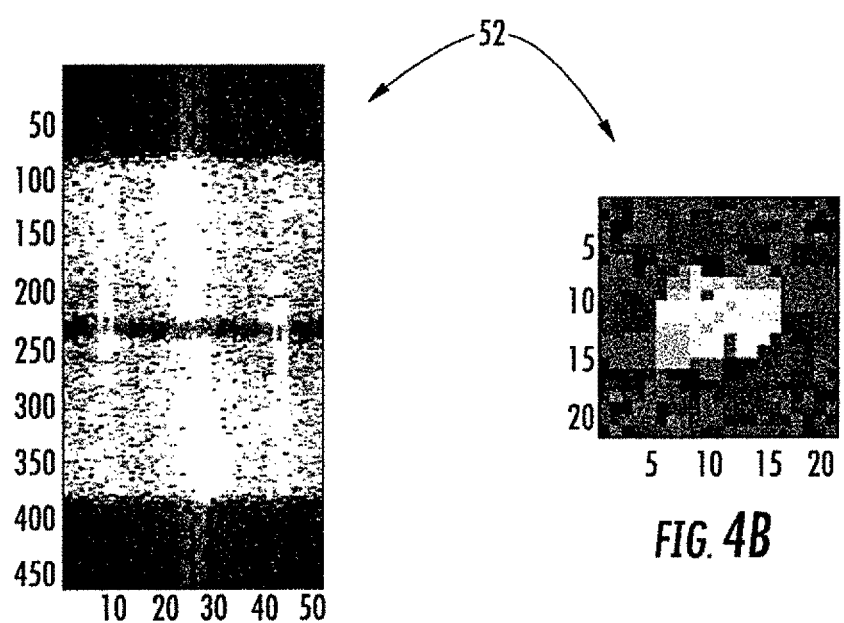
FIG. 4A
FIG. 4B

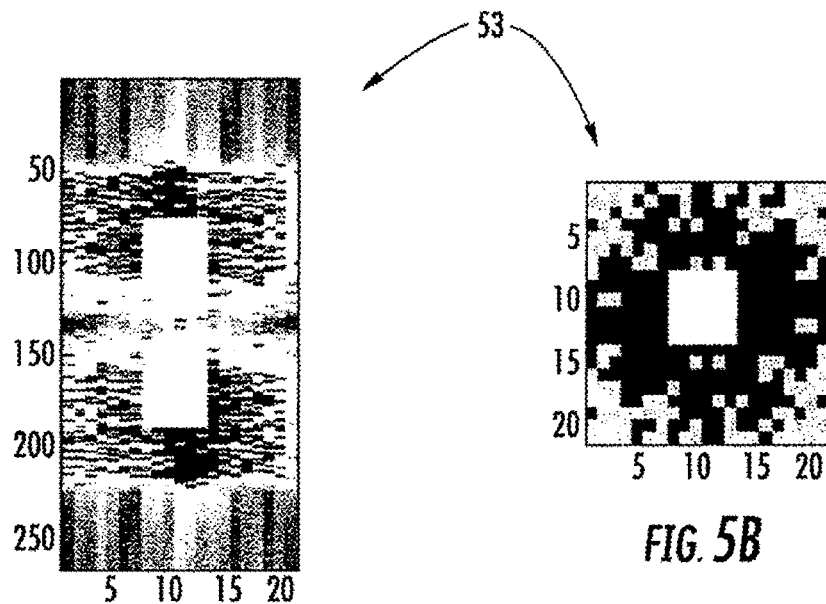
FIG. 5A
FIG. 5B
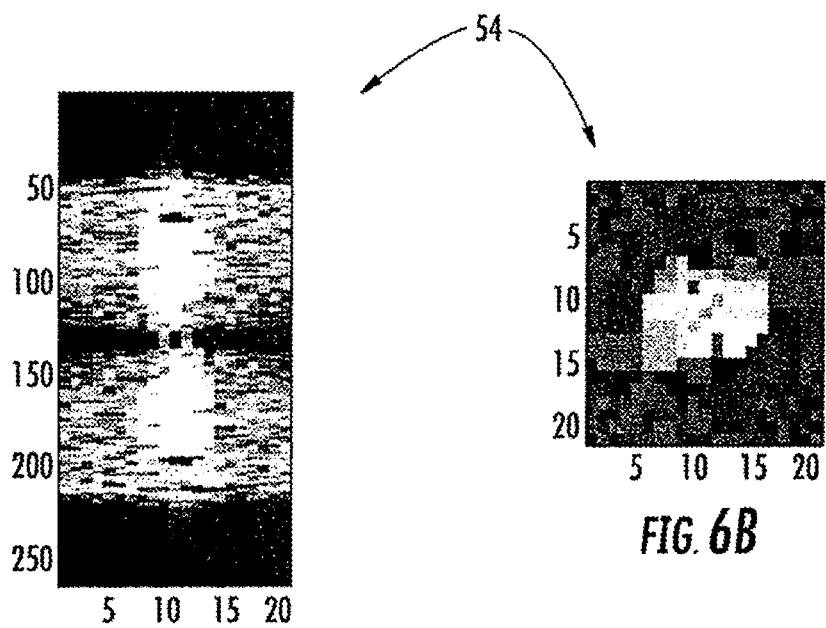
FIG. 6A
FIG. 6B

SEISMIC MODELING SYSTEM PROVIDING SEISMIC SURVEY DATA FREQUENCY DOMAIN INPAINTING AND RELATED METHODS

TECHNICAL FIELD

The present invention relates to the field of data modeling, and, more particularly, to modeling systems such as seismic surveying and modeling systems and related methods.

BACKGROUND

In sub-surface geological surveying, such as for oil and gas exploration, various approaches are used in an attempt to "see" below ground to help determine what is in the given geological formation before going to the expense of drilling an exploratory well. One such approach is to direct compressional or "P" waves at the geological surface and measure the returns from the waves reflecting off of different materials in the ground. Another related approach is to use shear or "S" waves for this same purpose, which propagate through solids only.

Various difficulties may arise with such approaches when there are obstructions in the geological formation that cause distorted or no signal returns for certain areas within the geological formation. For example, one such obstruction is gas clouds in a geological formation, which may distort the signature data returned, and/or make it appear that certain areas (such as oil deposits) are located at the wrong depth in the formation. Thus, even knowing that there is an oil formation beneath a gas cloud, it is still possible that a well being drilled may still miss the deposit because of drilling to an incorrect depth. Moreover, there may be other types of obstructions in the formations (e.g., water pockets, basalt, volcanic rock layers, etc.) that may block signal returns altogether in some areas, resulting in incomplete data sets from P or S wave signal collection.

As such, advancements in correcting and/or filling missing data in seismic survey data sets may be desirable in certain applications.

SUMMARY

A seismic modeling system is provided which may include a seismic model data storage device, and a processor cooperating with the seismic model data storage device to transform a seismic model spatial domain data set associated with the given region into a seismic frequency domain data set, where the given region includes a suspect region. The processor may also transform a seismic model spatial domain data subset associated with the suspect region into a seismic frequency domain data subset, and perform inpainting of the seismic frequency domain data subset based upon the seismic frequency domain data set. The processor may further convert the inpainted seismic frequency domain data subset into an inpainted spatial domain data subset, and substitute the inpainted spatial domain data subset for the seismic model spatial domain data subset associated with the suspect region in the seismic model spatial domain data set associated with the given region.

By way of example, the seismic model spatial domain data set may comprise a compressional wave data set.

Furthermore, the processor may substitute the inpainted spatial domain data set based upon a vertical correlation compensation.

In accordance with one example embodiment, the processor may inpaint based upon an exemplar inpainting algorithm. In another example embodiment, the processor may inpaint by propagating contour data (e.g., elevation and/or impedance data) along a direction of lines of constant contour from adjacent portions of the seismic frequency domain data set into the seismic frequency domain data subset. More particularly, the contour data may include at least one of phase and amplitude data. Additionally, the processor may iteratively propagate the contour data into the seismic frequency domain data subset.

In accordance with an example embodiment, the processor may perform inpainting based upon at least one turbulent fluid flow modeling equation. By way of example, the at least one turbulent fluid flow modeling equation may comprise at least one Navier-Stokes equation.

A related seismic modeling method may include using a processor to transform a seismic model spatial domain data set associated with a given region into a seismic frequency domain data set, with the given region including a suspect region, transform a seismic model spatial domain data subset associated with the suspect region into a seismic frequency domain data subset, and perform inpainting of the seismic frequency domain data subset based upon the seismic frequency domain data set. The method may further include using the processor to convert the inpainted seismic frequency domain data subset into an inpainted spatial domain data subset, and substitute the inpainted spatial domain data subset for the seismic model spatial domain data subset associated with the suspect region in the seismic model spatial domain data set associated with the given region.

A related non-transitory computer-readable medium may have computer-executable instructions for causing a computer to perform steps including transforming a seismic model spatial domain data set associated with a given region into a seismic frequency domain data set, with the given region including a suspect region, transforming a seismic model spatial domain data subset associated with the suspect region into a seismic frequency domain data subset, and inpainting the seismic frequency domain data subset based upon the seismic frequency domain data set. The steps may further include converting the inpainted seismic frequency domain data subset into an inpainted spatial domain data subset, and substituting the inpainted spatial domain data subset for the seismic model spatial domain data subset associated with the suspect region in the seismic model spatial domain data set associated with the given region.

BRIEF DESCRIPTION OF THE DRAWINGS

FIGS. 3a-8a are various vertical cross-sectional views of the seismic model spatial domain data set of FIG. 2 taken along line a-a illustrating a frequency domain inpainting operation by the system of FIG. 1 in accordance with an example embodiment, and FIGS. 3b-8b are corresponding lateral cross sectional views to those of FIGS. 3a-8a taken along line b-b in FIG. 2.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

Figure 1:
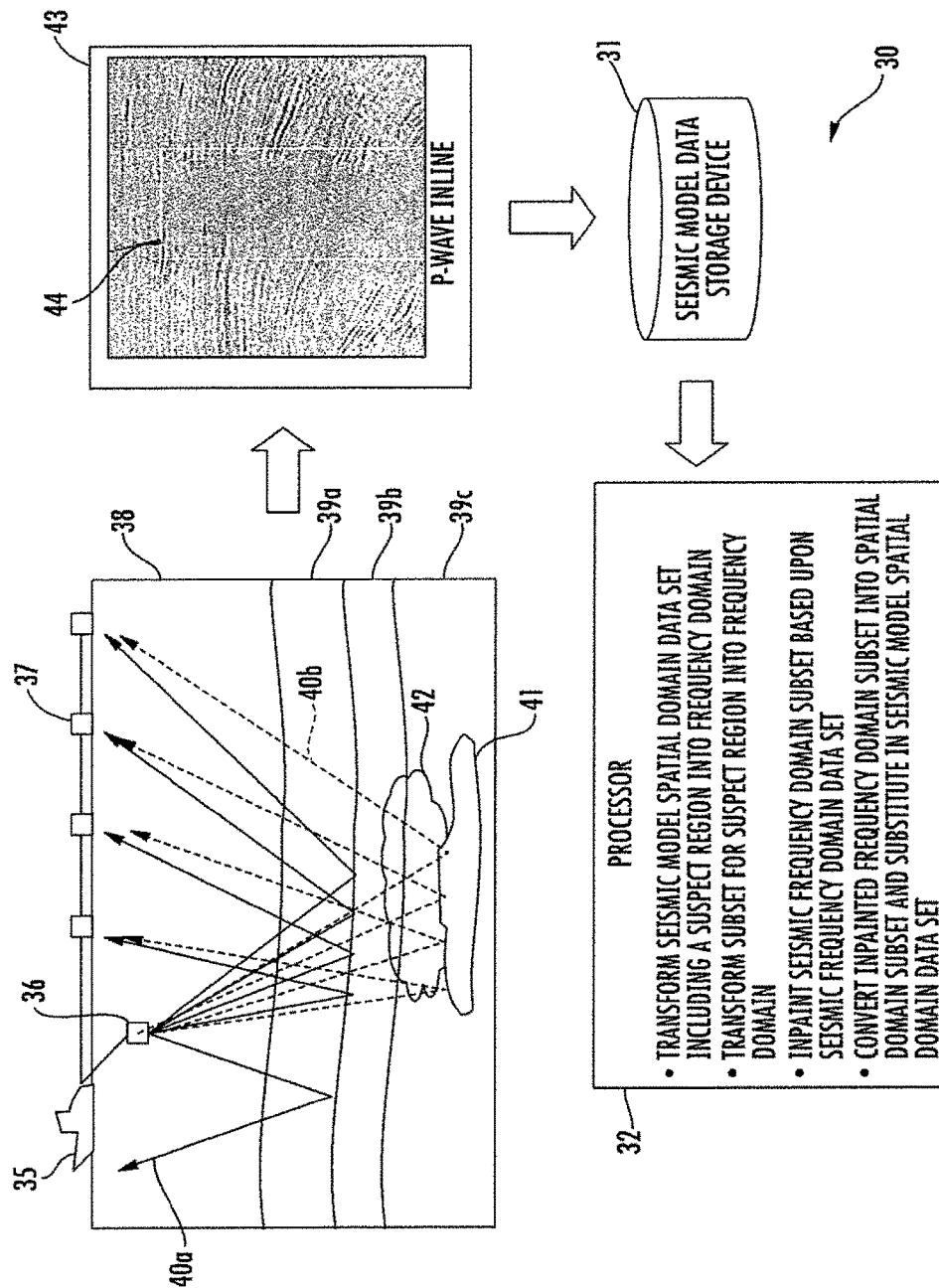
FIG. 1 is a schematic block diagram of a seismic modeling system in accordance with an example embodiment.
Figure 2:
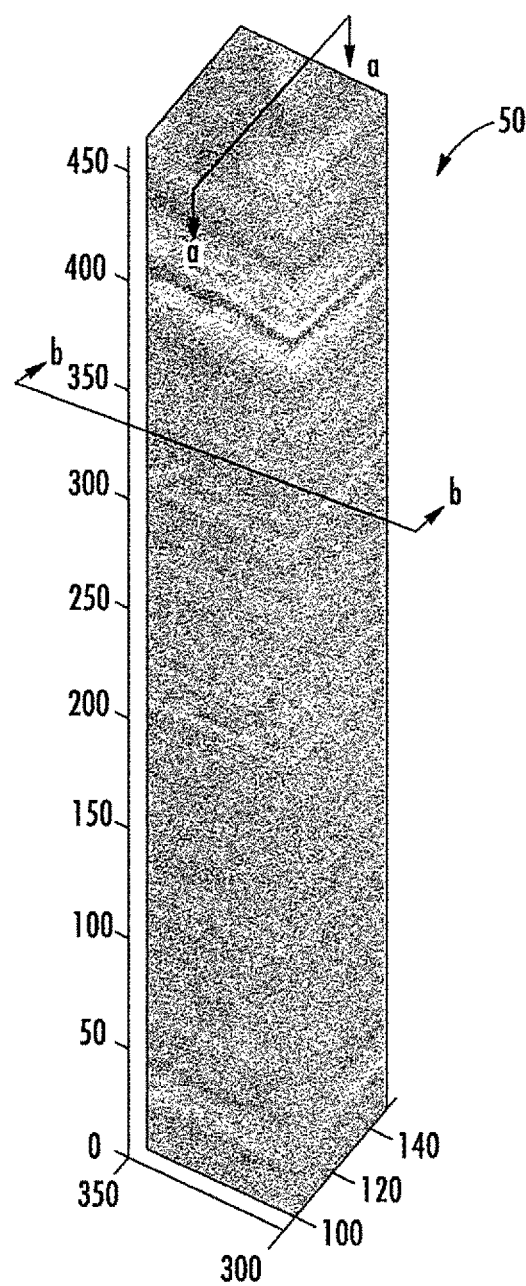
FIG. 2 is a 3D representation of a seismic model spatial domain data set for a geographical region.
Figures 7A, 7B:
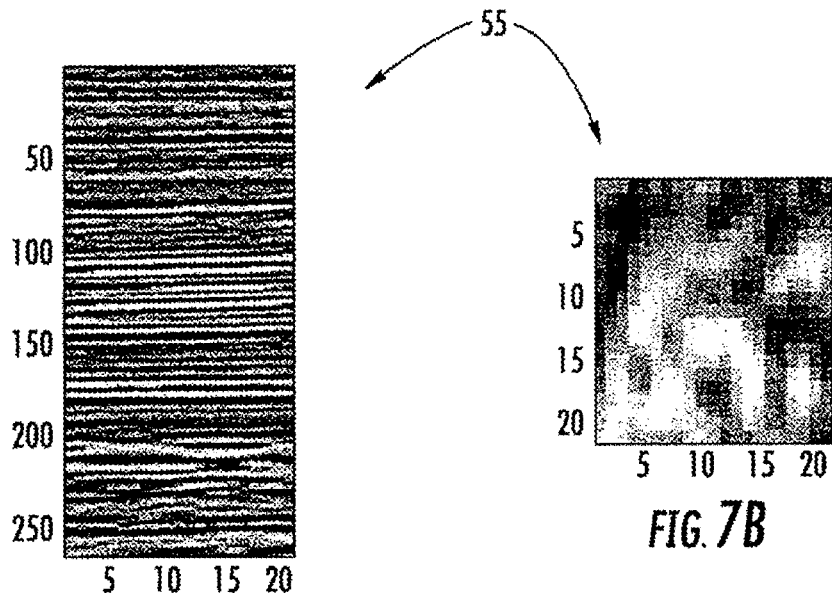
Figures 8A, 8B:
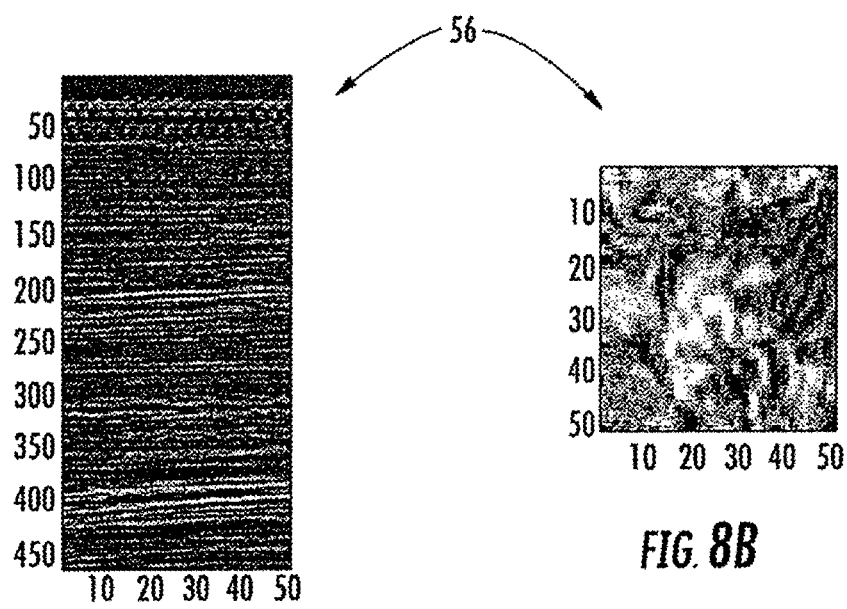

Referring initially to FIG. 1, a seismic modeling system 30 illustratively includes a seismic model data storage device 31 for storing a seismic model spatial domain data set and a processor 32. By way of example, the processor 32 may be implemented using a central processing unit (CPU) or microprocessor of a PC, Mac, Sun, or other computing workstation, along with an associated non-transitory computer-readable medium having computer executable instructions for performing the various operations described further herein.

The system 30 advantageously allows for regions of data in a seismic model data set that are partially corrupted, missing, or otherwise suspect to be inpainted based upon data surrounding the suspect or missing region. In the example illustrated in FIG. 1, a subsea data collection approach is illustrated in which a vessel 35 utilizes a seismic airgun 36 and an array of audio monitors or transducers 37 for compressional wave (P wave) seismic data collection of an undersea geological formation. However, it should be noted that the techniques described herein may be used for land-based seismic survey data, and also by other approaches than P wave data collection (e.g., seismic or S wave collection, etc.).

In the present example, below the ocean 38 there are various geological layers 39a-39c one on top of the other as shown. The geological makeup or constituency of the various layers 39a-39c will cause them to pass or reflect different frequency signals. This is illustratively represented by signal lines 40a, which correspond to a frequency that causes them to be reflected back towards the audio monitors 37 by the material(s) in the layer 39b. Moreover, signal lines 40b, which correspond to a frequency that penetrates through the layers 39a-39c to an oil and gas deposit 41, are similarly reflected off the oil or gas deposit back to the audio monitors 37. All of the audio signal frequency returns may then be used to create a time or spatial domain data set 43 that maps the various frequency reflections to their respective depths for the surveyed region. By way of example, the data set may be stored in a SEG Y file format, although other suitable file formats may be used in different embodiments. In some embodiments, the signal return information may be augmented with core sample data where such information has been collected for the given geographical region, although this is not required in all embodiments.

However, in some instances there are obstructions, which in the present example is a gas cloud 42, that may interfere with the signal frequency returns. Generally speaking, a gas cloud may occur where there is a pocket of gas that begins to permeate through a porous rock layer, etc., and thus branches out away from the cavity where the original gas pocket is located. Such gas clouds may cover several kilometers in area, and may move or migrate over time. As noted above, other examples of obstructions may include water pockets, basalt, volcanic rock layers, etc.

Depending on the particular obstruction, the signal frequency returns may either be completely blocked so that no information is returned for a given region or portion of the area being surveyed, or the information returned for the given region is blurred or obscured. Moreover, in these cases, it may appear that certain formations such as the oil and gas deposit 42 are shifted down below where it is actually present within the formation. Such a "blurred" result is present in the data set 43 as a result of the gas cloud 42, as indicated by the rectangle 44. The data within the rectangle 44 is therefore considered to be suspect data, in that its resolution indicates that there may be missing frequency information for the given region within the surveyed area that makes this particular part of the data set untrustworthy. The blurring may be due to missing high frequency information, while the shifting down may be due to acoustic velocity distortion.

Figure 11:
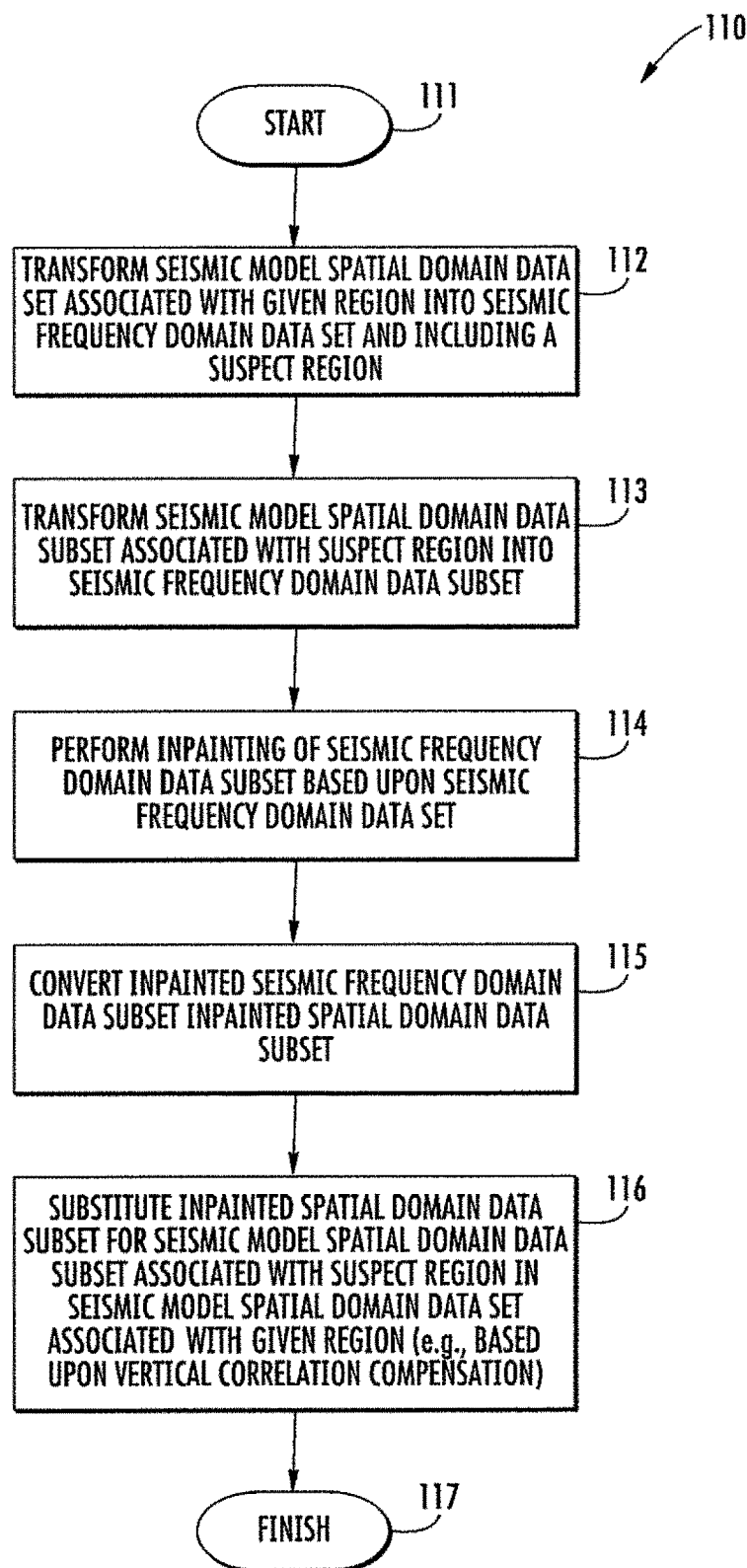
FIG. 11 is a flow diagram illustrating method aspects associated with the system of FIG. 1.

Referring additionally to FIGS. 2-8b and the flow diagram 110 of FIG. 11, beginning at Block 111, the processor 32 may cooperate with the seismic model data storage device 31 to transform a seismic model spatial domain data set 50 associated with a given region into a seismic frequency domain data set 52 (e.g., via fast Fourier transform (FFT)), at Block 112. In this example, the given region includes a suspect region bounded by a rectangle 51 in the data set, which is caused by an obstruction such as a gas cloud, as discussed above. In the present example, the suspect region was created by removing high frequency return information from within the region bounded by the rectangle 51 so that it would not only be blurred with respect to the surrounding data, but also vertically shifted to simulate the effects of a gas cloud. In addition, the processor 32 also transforms the subset of the data set 50 that is associated with the suspect region (i.e., the area inside the rectangle 51) into a seismic frequency domain data subset 53, at Block 113.

The processor 32 may then perform inpainting of the seismic frequency domain data subset 53 based upon the overall seismic frequency domain data set 52, at Block 114. In the present example, the data set 52 and subset 53 are magnitude spectrums of the spatial domain data set 50 and the suspect region thereof, respectively, and for clarity of explanation reference to inpainting frequency data herein is with reference to inpainting the magnitude spectrum data. However, it will be appreciated that the corresponding phase spectrum data may in addition, or instead, be inpainted in the frequency domain in some embodiments, if desired, using the same techniques described herein for inpainting of the magnitude spectrum data.

Figure 9A:
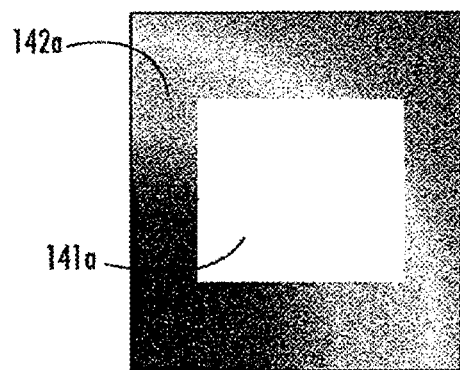
FIGS. 9A-9D are a series of close-up views of a void in a model data set illustrating a partial differential equation (PDE) inpainting technique which may be used by the system of FIG. 1.
Figure 9B:
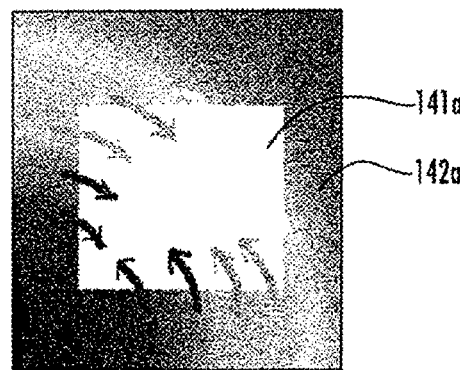
Figure 9C:
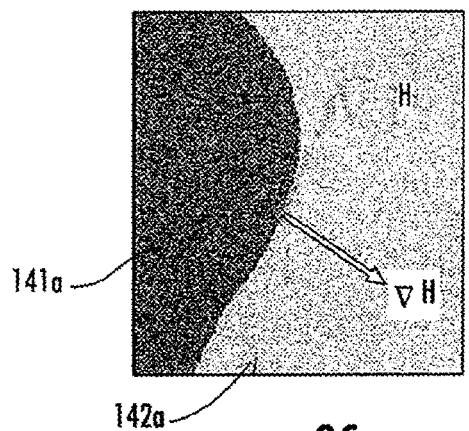

The inpainting may be performed using various approaches. One such approach is a partial differential equation (PDE) based inpainting approach illustrated in FIGS. 9A-9D. Generally speaking, voids 141*a* are inpainted in a data set by propagating contour data from outside a given void into the given void. More particularly, seismic data may include height or elevation information as well as impedance information. The processor 32 inpaints by propagating seismic contour data (e.g., elevation and/or impedance information) from outside the given void 141*a* along a direction of lines of constant elevation contour from outside the given void into the void, as seen in FIGS. 9A-9D. More particularly, the lines of constant elevation contour may be based upon isophote ($\nabla^P H$) and gradient ($\nabla H$) directions at given points along the void boundary, as shown in FIG. 9C. As will be appreciated by those skilled in the art, inpainting is a non-linear interpolation technique which in the present example is used to propagate the data from the area around a void created by an extracted building to "fill" the void.

More particularly, the processor 32 propagates elevation information from outside the void along a direction of iso-contour, as represented by the following equation:

$$\frac{\partial I}{\partial t} = \nabla L \cdot N, \quad (1)$$

where $\nabla L$ is a discrete Laplacian transform. An iso-contour direction N is obtained by taking a 90 degree rotation of the gradient, as will be appreciated by those skilled in the art. An example inpainting equation for performing the above-noted propagation is as follows:

$$H^{n+1}(i,j) = H_n(i,j) + \Delta t H_t^n(i,j), \forall (i,j) \in \Omega. \quad (2)$$

Figure 9D:
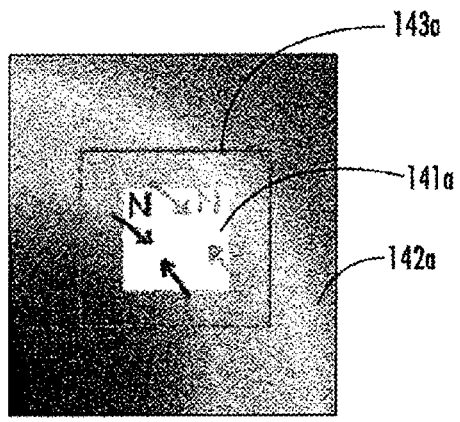
Figure 10A:
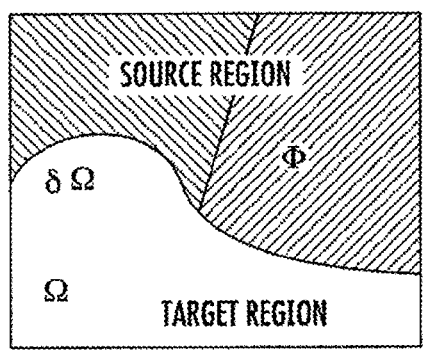
FIGS. 10A-10D are a series of close-up views of a void in a model data set illustrating an exemplar inpainting technique which may be used by the system of FIG. 1.
Figure 10B:
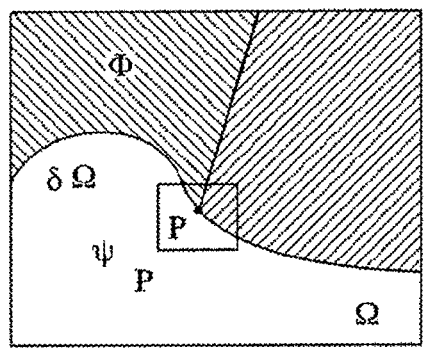
Figure 10C:
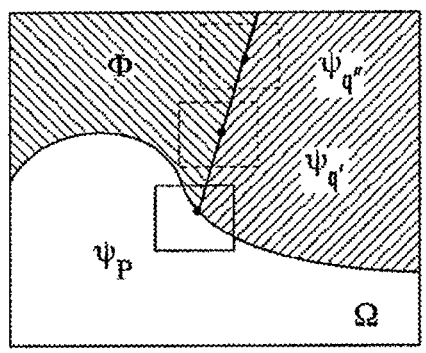
Figure 10D:
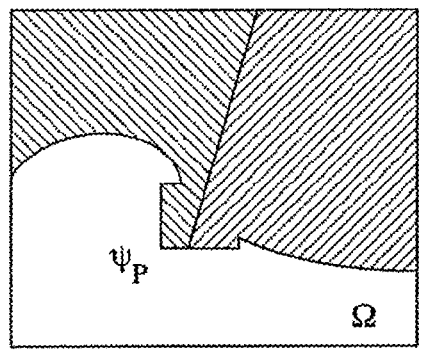

The above-noted propagation is performed a certain number of iterations to "shrink" the void to a desired size as seen in FIG. 9D. The starting boundary 43*a* of the void is shown in FIG. 9D so that the amount of propagation from one iteration may be seen. By way of example, several thousand iterations of propagation may used for inpainting in a typical seismic data inpainting application, although different numbers of iterations may be used in different embodiments depending upon the required accuracy and the computational overhead associated therewith.

Generally speaking, the above-described approach essentially treats the data set to be inpainted as an incompressible fluid, which allows fluid mechanics techniques to be used for filling in the voids. That is, the partial differential equations outlined above are used to estimate how the boundaries directly adjacent a void in the data set would naturally flow into and fill the void if the seismic data set was considered to be an incompressible fluid.

More particularly, with respect to the frequency domain (i.e., K space) data in the seismic data subset 53, the contour data corresponds to the phase and/or amplitude values of the data surrounding the voids. Here again, the propagation is preferably iteratively performed a desired number of iterations, or until a steady state is achieved.

Once again, this approach is based upon reconstructing data for frequencies that are missing from a frequency domain representation of a geological area of interest by modeling the spectral signatures that are present in the data surrounding the voids as a turbulent (i.e., fluid) flow. That is, each individual known frequency is treated as a particle in an eddy flow, which are small turbulence fields inside of a general turbulence field. As such, the known "eddies" in the frequency domain data can therefore be modeled to interpolate the missing values.

Furthermore, in the illustrated example illustrated in FIGS. 5A and 5B, the magnitude spectrum data subset 53 is not completely void of all frequencies, but rather will be missing one or more particular ranges of frequencies as a result of the obscured frequency returns caused by the subterranean obstruction (e.g., the gas cloud 42). That is, other frequencies will still be present within the seismic data subset 53. Stated alternatively, in this seismic data inpainting example, the "voids" will be where the frequency data is incomplete. The presence of some frequency data within the suspect region will also serve as contour lines within the suspect region that will further guide the inpainting of the missing frequencies, in addition to the lines of contour from outside of the suspect area as described above.

With respect to the frequency data inpainting, the processor 32 may perform inpainting or seam smoothing based upon one or more turbulent fluid flow modeling equations. By way of example, Wavier-Stokes fluid mechanics equations/relationships may be used with some modification for K-space. More particularly, the stream function will have two components rather than one as follows:

$$\Psi = A(k_x,k_y)e^{z\phi(k_x,k_y)} = R(k_x,k_y) + zQ(k_x,k_y), \quad (4)$$

where the functions A, R, and Q are four times differentiable, and $z=\sqrt{-1}$. Thus, looking at the derived equations with respect to image intensities results in the following:

$$\frac{\partial}{\partial t}(\nabla^2 \Psi) + (v \cdot \nabla)(\nabla^2 \Psi) = \nu \nabla^2 \cdot (\nabla^2 \Psi). \quad (5)$$

The iterative propagation described above results in an inpainted seismic frequency data subset 54 (magnitude only in the current example). The above-described approach may accordingly allow for autonomous reconstruction of seismic data in places where obstructions cause the loss of some or all of the frequency data in a suspect region, yet while still retaining continuous elevation contours. Moreover, the non-linear interpolation technique of inpainting allows for accurate propagation of data from the area surrounding a void boundary. Further, the seismic data may advantageously be iteratively evolved until a steady state is achieved, and the speed of propagation may be controlled to provide a desired tradeoff between accuracy of the resulting geospatial data and the speed so that the processing overhead burden does not become undesirably large.

The processor 32 may then convert the inpainted seismic frequency data subset 54 into a "repaired" inpainted spatial domain data subset 55, at Block 115, using an inverse FFT.

The processor 32 may accordingly substitute the inpainted spatial domain data subset 55 for the seismic model spatial domain data subset associated with the suspect region (i.e., the area within the rectangle 51 in FIGS. 3A and 3B) in the seismic model spatial domain data set 50 to provide a repaired seismic spatial domain data set 56, at Block 116. This concludes the method illustrated in FIG. 11 (Block 117). In some instances, a vertical correlation compensation may be used by the processor 32 when performing the substitution so that the data subset 55 is properly aligned at the correct depth. Moreover, a seam-smoothing operation may optionally be performed in some applications using a Navier-Stokes seam smoothing approach, or a Poisson-based seam smoothing approach such as described in U.S. Pat. No. 8,239,175 to Wivell et al., which is assigned to the present Assignee and is hereby incorporated herein in its entirety by reference.

While various PDE based approaches were described for inpainting above, it should be noted that the frequency domain data subset could also be inpainted using an exemplar based approach. Moreover, an approach where both types of inpainting are alternatively used on a same void may be used, such as described in U.S. Pat. No. 7,881,913 to Smith et al., which is assigned to the present Assignee and is hereby incorporated herein in its entirety by reference. Generally speaking, exemplar inpainting is a patch-based texture synthesis approach that has a priority scheme for strong gradients in the scene. Exemplar inpainting fills in void regions, from the smallest to the largest (if more than one), by systematically searching for the data that is the "best fit" in the input data set. Unlike parametric approaches which have limitations based on the size of the void to be filled in and the smoothness, the exemplar method is well suited for removing large voids containing high frequency data in a scene. As noted above, seismic data may include height or elevation information as well as impedance information, either or both of which may be inpainted using the techniques described herein.

Referring now to FIGS. 10A-10D, the exemplar algorithm is an isophote-driven image sampling process. There are several steps that go into inpainting a region $\Omega$. The boundary $\partial\Omega$ evolves inward, and the contour $\partial\Omega$ is the fill front. The object is to obtain data from somewhere that will fill in the region $\Omega$ of missing data (i.e., the void). The source region $\Phi$ is chosen as the region from which the fill data will be obtained. It should be noted that the source region $\Phi$ may come from different locations from within the image, or from other images, such as another data set for the geological region in question, in some embodiments.

To perform an iteration of exemplar-based inpainting, a point p is first identified. In the illustrated embodiment, a square template (i.e., patch) is obtained about the point p, where the patch is designated as $\Psi_p \in \Omega$. A statistical approach is employed to find a patch $\Psi_{\hat{q}} \in \Phi$ centered at $\hat{q}$ which is most similar to those parts already filled in $\Psi_p \in \Omega$, as will be appreciated by those skilled in the art. It should be noted that the search space that is required to find the completely filled in template $\Psi_q \in \Phi$ may be varied.

A potential drawback of template-based exemplar inpainting is its ability to handle linear features. Criminisi, et. al in a presentation entitled "Object Removal by Exemplar-based Inpainting," June 2003 Madison, Wis. Proc. IEEE Computer Vision and Pattern Recognition, describe a scheme for assigning patch priority. The order of filling in the patches is significant. Criminisi et al. proposed that given a patch $\Psi_p$ centered at p for some p∈∂Ω, its priority P(p) is defined as the product of two terms, that is: P(p)=C(p)D(p). C(p) is the confidence term, and D(p) is the data term, which are defined as follows:

$$C(p) = \frac{\sum_{q \in \Psi_p \cap \bar{\Omega}} C(q)}{|\Psi_p|}, \text{ and}$$

$$D(p) = \frac{|\nabla I_p^\perp \cdot n_p|}{\alpha},$$

where $|\Psi_p|$ is the area of $\Psi_p$, $\alpha$ is a normalization factor (e.g. 255 for a typical gray value image), and $n_p$ is the unit vector orthogonal to the front $\partial\Omega$ in the point p.

The priority is computed for every border patch, with distinct patches for each pixel on the boundary of the target region $\Omega$. During initialization, the function $C(p)=0 \ \forall p \in \Omega$, and $C(p)=1 \ \forall p \in I-\Omega$. The confidence term C(p) can be thought of as a measure of the amount of reliable information (i.e., pixels) surrounding the point p. The goal is to first fill in pixels in those patches which have more of their pixels already filled, with additional preference given to pixels that were filled in earlier. The term D(p) is a function of the strength of the isophotes hitting the front $\partial\Omega$ at each iteration. The term encourages patches that contain linear features to be filled in first along the front. Therefore, this algorithm encourages a patch-based infilling technique that handles structural and high-frequency content at the same time.

Figure 12:
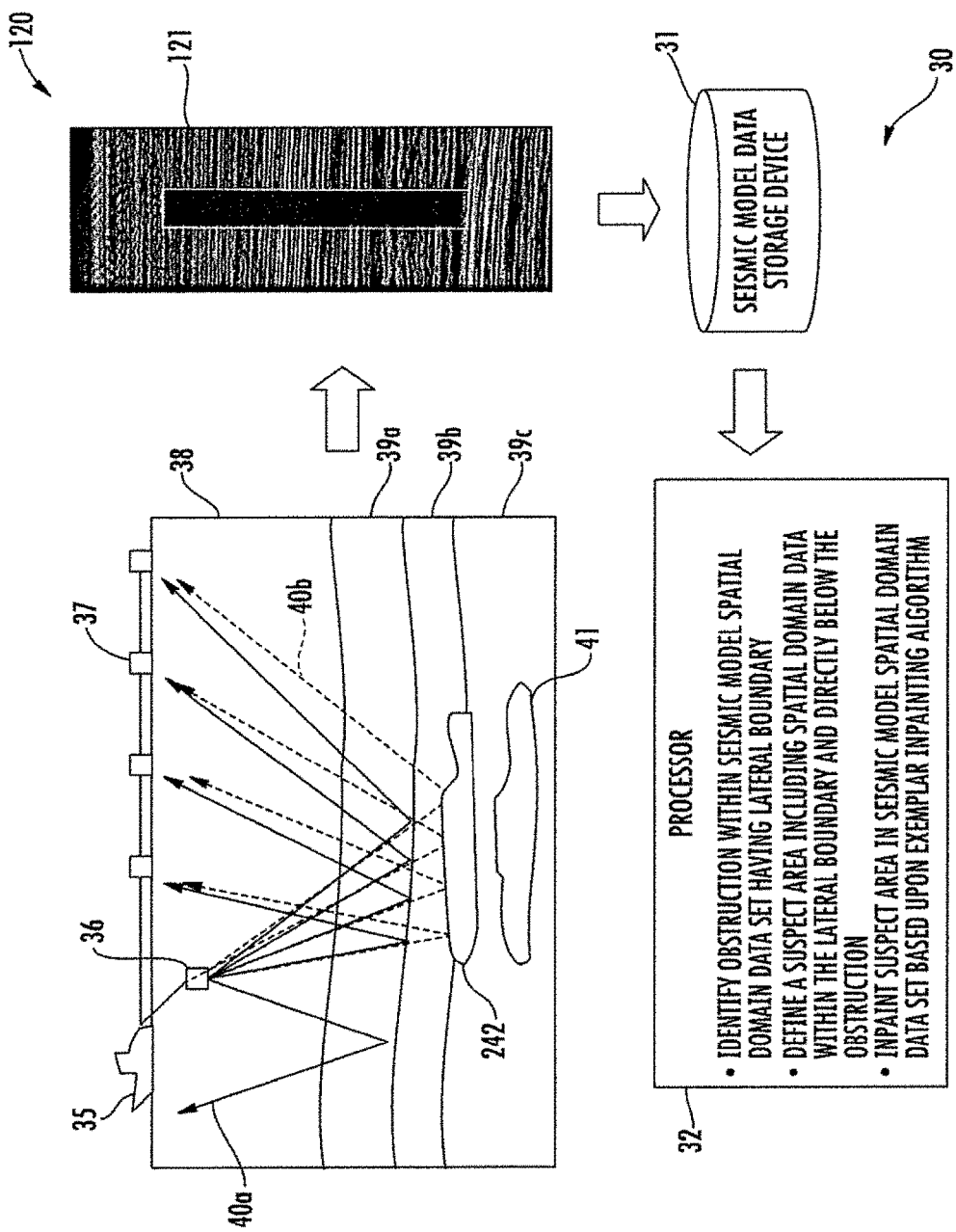
FIG. 12 is a schematic block diagram of a seismic modeling system in accordance with another example embodiment.
Figures 13A, 13B:
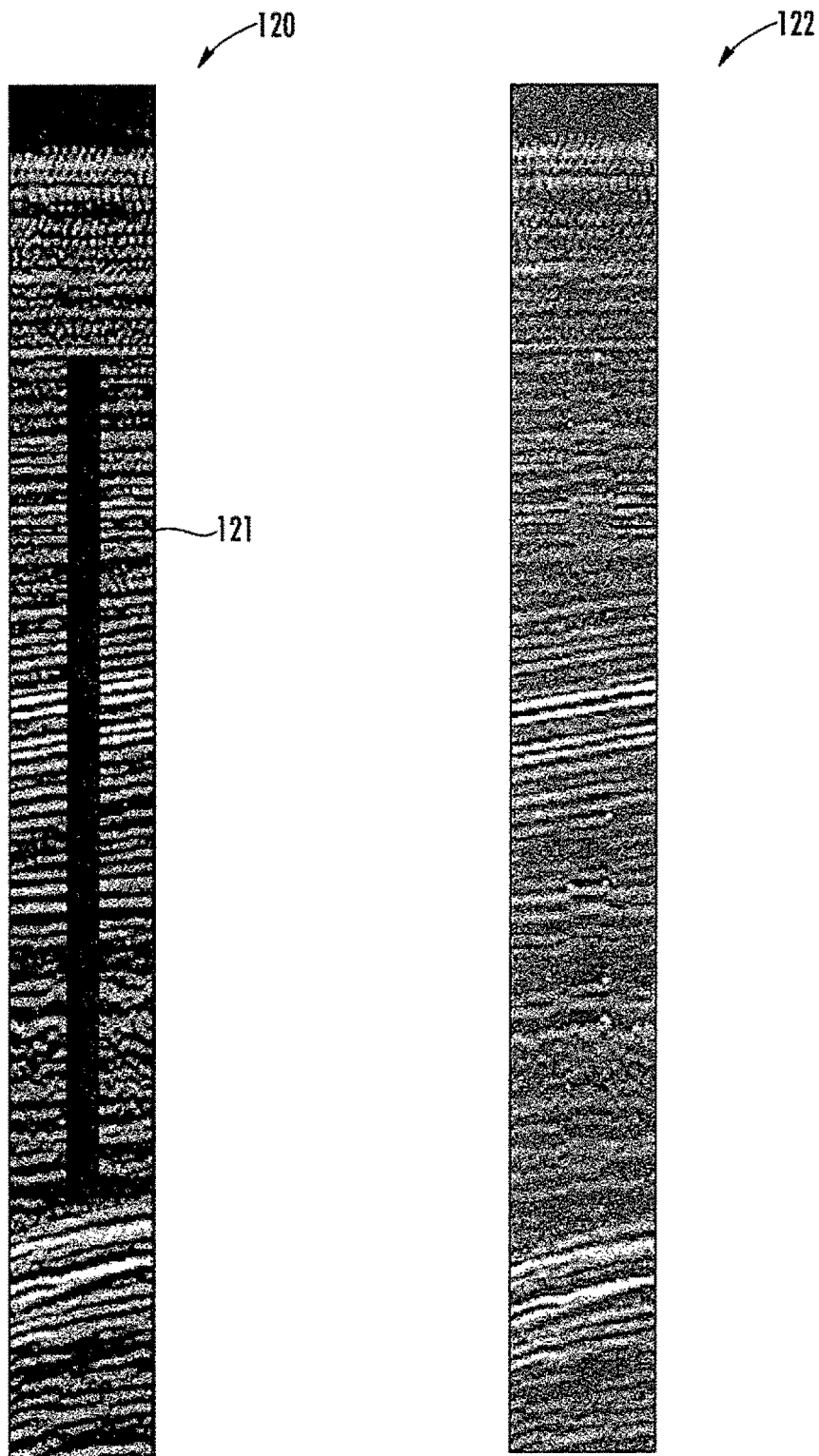
FIG. 13A is a cross-sectional view of a seismic model spatial domain data set having a void therein caused by an obstruction.
FIG. 13B is a corresponding cross-sectional view to that of FIG. 13A after an exemplar inpainting operation by the system of FIG. 12.
Figure 14:
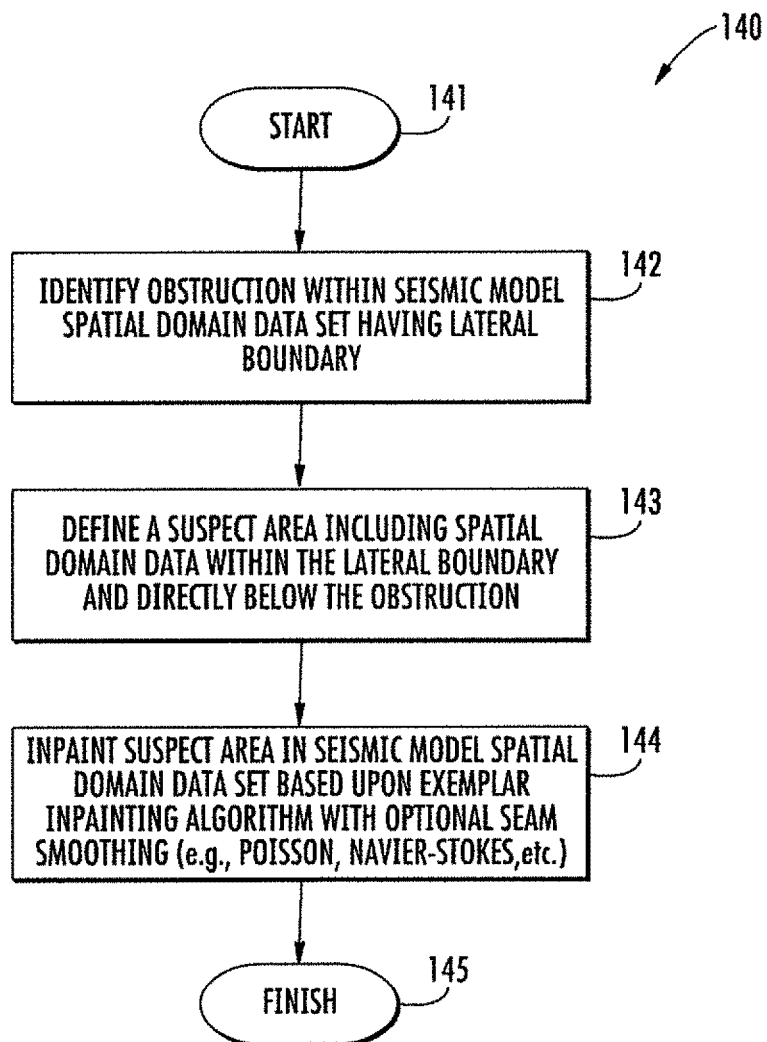
FIG. 14 is a flow diagram illustrating method aspects associated with the system of FIG. 12.

Turning to FIGS. 12-14, another example seismic inpainting application where such an exemplar inpainting approach may be particularly advantageous is now described. Similar to the prior application, subsea compressional wave (P wave) seismic data collection is perform by the vessel 35 utilizing the seismic airgun 36 and audio monitors 37. However, in this case, the obstruction 242 above the oil and gas deposit 41 is not a gas cloud, but instead is an underground "lake" or water concentration. Such obstructions may block some, if not all, frequencies from passing therethrough to the oil and gas deposit 41 below, which results in a void 121 in a returned seismic model spatial domain data set 120 (e.g., P Wave data set) corresponding to the area or region below the obstruction 242. In the example of FIGS. 12 and 13A, data was removed from within the rectangle in the data set 120 to simulate such a suspect area as the void 121.

Beginning at Block 141 of the flow diagram 140, the processor 32 may identify the obstruction 121 within the seismic model spatial domain data set 120 having a lateral boundary, at Block 142, and define a suspect area (here the area within the rectangle) including spatial domain data within the lateral boundary and directly below the obstruction, at Block 143. More particularly, the processor 32 may determine the vertical depth at which the top of the obstruction is positioned, as well as the lateral outline or boundary of the obstruction, and this shape may be projected downward through the geological formation to define the suspect area within this 3D volume as the void 121 to be inpainted. This may be an irregularly shaped volume, or in some embodiments such as the one illustrated in FIGS. 12 and 13A, a rectangular cuboid (or other shapes such as a cylinder, etc.) may be used to define the void 121.

The processor 32 may then inpaint the suspect area in the seismic model spatial domain data set 120 based upon an exemplar inpainting algorithm or approach, such as the one described above, at Block 144, which illustratively concludes the method illustrated in FIG. 14 (Block 145). An inpainted seismic spatial domain data set 122 which results from inpainting of the void 121 in the original seismic spatial domain data set 120 is shown in FIG. 13B. As described above, the inpainting may be performed iteratively until a stopping value associated with the given void is at a steady state or below an error threshold, for example. Moreover, in some embodiments, a pre-conditioning of the data may be performed prior to inpainting, such as a pre-stack migration signal processing enhancement. Additional pre-conditioning may include phase unwrapping in order to ensure that all appropriate multiples of 2 pi ($\pi$) are included when processing the phase response.

Figure 15:
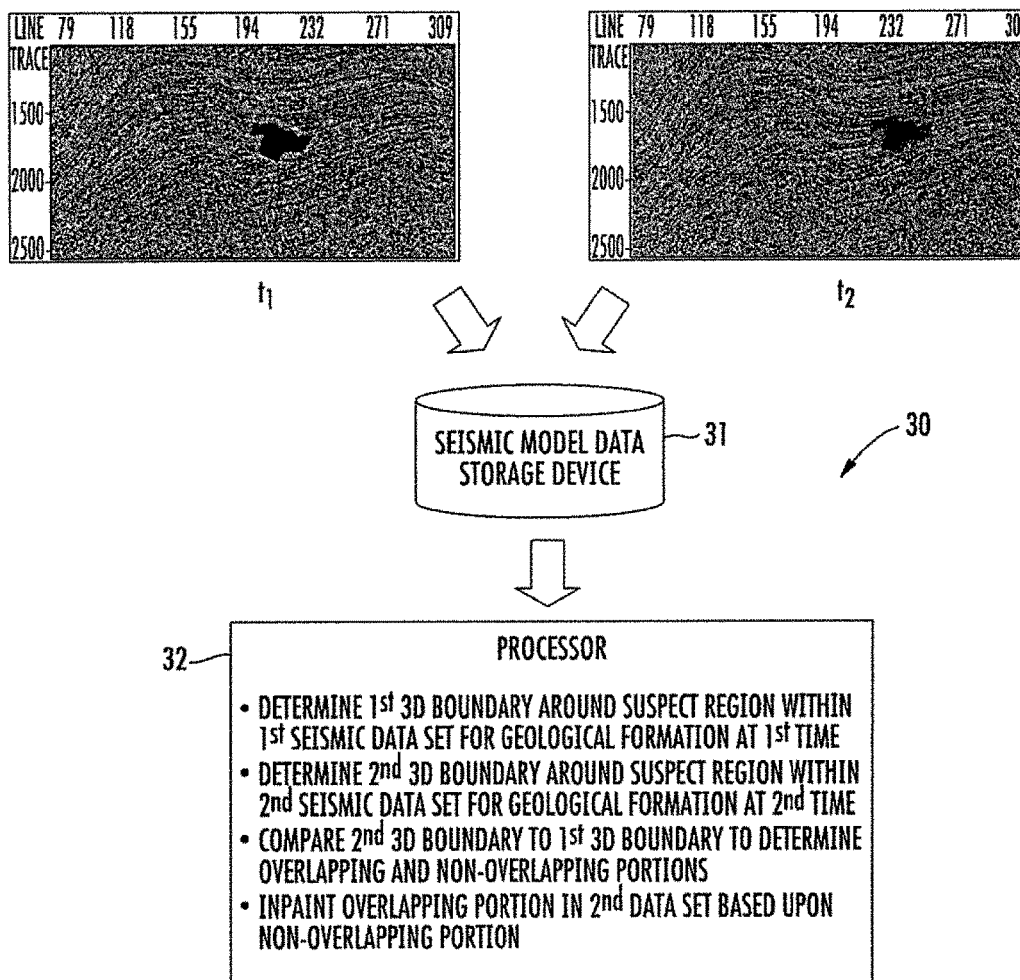
FIG. 15 is a schematic block diagram of a seismic modeling system in accordance with still another example embodiment.
Figure 16A:
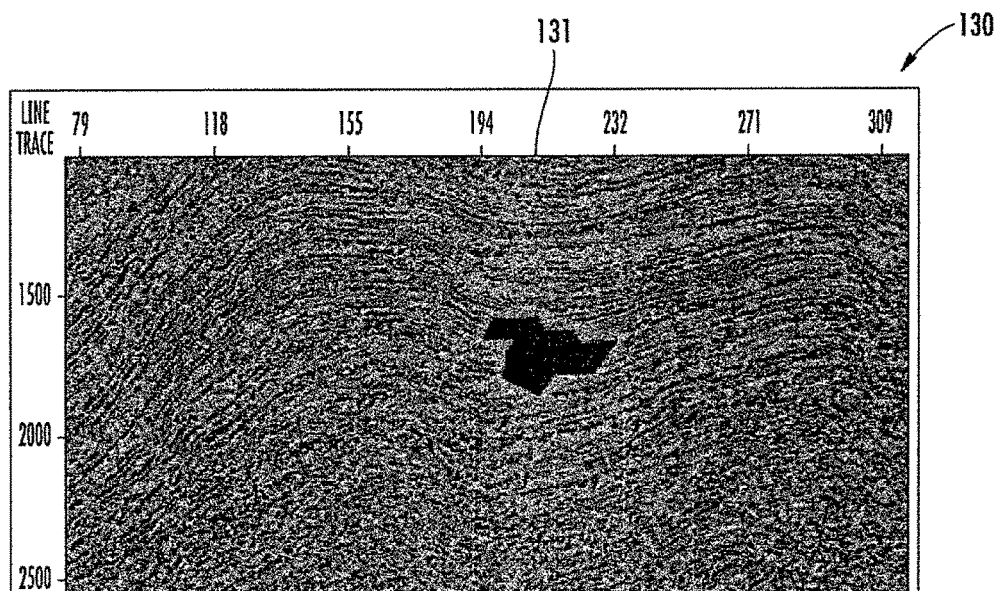
FIG. 16A is a cross-sectional view of a seismic model spatial domain data set for a geographical region having a suspect region therein at a first time.
Figure 16B:
FIG. 16B is a cross-sectional view of a seismic model spatial domain data set for the geographical region with the suspect region at a second time after the suspect region has moved, and which may be inpainted by the system of FIG. 15 based upon a comparison of the suspect regions at the first and second times.
Figure 16B:
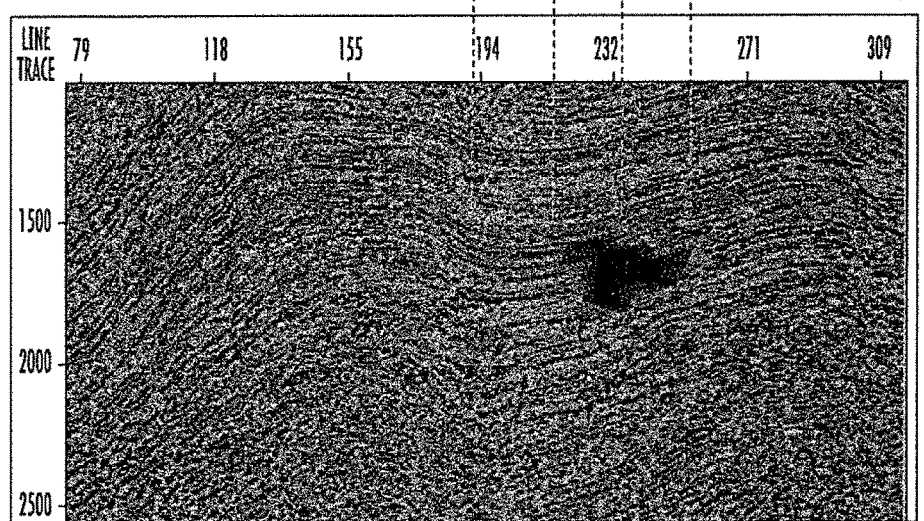

Turning now to FIGS. 15-18, with respect to obstructions such as gas clouds in a geological formation, the boundaries of the gas clouds may change over time, either by a migration of the cloud within the formation or a change in the volume or shape of the cloud. One such example is illustrated in FIGS. 15-16B, in which at a first time $t_1$ an obstruction (e.g., gas cloud) results in a suspect region 131 in a first seismic spatial domain set 130, but at a second time $t_2$ the suspect region has moved to a different location in a second seismic spatial domain data set 132. In such cases, valuable information may be determined by comparing data which was originally obscured (i.e., in the suspect region) in the first data set 131, but is no longer within the suspect region in the second data set 132, and such information may be used to train the inpainting of the suspect region in the second data set.

To provide such training for inpainting, the processor 32 may provide for autonomous change detection of subterranean voids or suspect regions. More particularly, beginning at Block 171 of the flow diagram 170, the processor 32 may cooperate with the seismic model data storage device 31 to determine a first 3D boundary around the suspect region 131 within the first seismic model spatial domain data set 130 for a particular geological formation at the first time $t_1$, at Block 172, and determine a second 3D boundary around the suspect region within the second seismic model spatial domain data set 132 for the geological formation at the second time $t_2$ after movement of the suspect region, as described above (Block 173). The processor 32 may then compare the second 3D boundary to the first 3D boundary to determine an overlapping portion OP where the first and second 3D boundary regions overlap, and one or more non-overlapping portions NOP1, NOP2 where the first and second boundaries do not overlap, at Block 174. In the illustrated example, the suspect region 131 has migrated from left to right between the time $t_1$ at which the first data set 130 was captured and the time $t_2$ when the second data set 132 was captured. Thus, the non-overlapping portion NOP1 which was obscured at time $t_1$ is no longer obscured. Moreover, the second non-overlapping portion NOP2 has become obscured at the time $t_2$, but it was not obscured at the time $t_1$.

The boundary comparison may be performed using various approaches including: root mean squared error (RMSE); center of mass; mutual information; differing 3D boundary voxels; motion; volume change; and surface area change. Motion of a gas cloud over time may be determined by a mean absolute error (MAE), mutual information, or content change.

More particularly, with respect to an RMSE comparison, a relative error is determined to measure a change within the seismic data. RMSE is computed by comparing each point in the first seismic data set 130 with the nearest point in the second seismic data set 132. An RMSE value near zero (or below a threshold value) indicates nearly identical 3D model or objects, which thereby allows for a direct measure of variation at the given point.

Regarding mutual information as a measure of change or similarity, mutual information is defined as:

$$I(X;Y)=H(X)+H(Y)-H(X,Y), \quad (1)$$

where I is mutual information and H is entropy (see eq. (2) below). The vectors X and Y correspond to histograms of seismic volume. When the data vectors are more similar, a higher numerical value is obtained. Entropy is defined as:

$$H(p_i)=-\Sigma p_i \log(p_i), \quad (2)$$

where p is the probability vector assumed to be a uniform distribution.

With respect to a center of mass comparison, the center of mass of a 3D solid is the unique point where the weighted relative position of the distributed mass sums to zero. The density of a solid 3D object at a given point may be determined with $\rho(x,y,z)$ being the density (mass per unit volume) of an object occupying a region D in space. The integral over D gives the mass of the object. More particularly, if the object is partitioned into n mass elements, when summing these mass element up, the total mass M is as follows:

$$M = \lim_{n\to\infty}\sum_{k=1}^{n}\Delta m_k = \lim_{n\to\infty}\sum_{k=1}^{n}\delta(x_k, y_k, z_k)\Delta V_k = \int\int\int_a^b \delta(x, y, z)dV$$

The integral of $\rho(x,y,z)$ gives the mass of the object:

$$M=\iiint_a^b \delta dV$$

where $\rho(x,y,z)$ is the density at point (x,y,z).

For volumetric processing, the suspect area may be divided into a plurality of "volume slices", to which optional removal processing may be performed in some embodiments. A 3D edge detection may then be performed on the volume slices, followed by a 3D blob filtering to build and select respective models for the volume slices. The slices may then be converted to an overall volume for the suspect area, and a voxel count may be compared as to the different volumes at times $t_1$ and $t_2$, for example.

Figure 17:
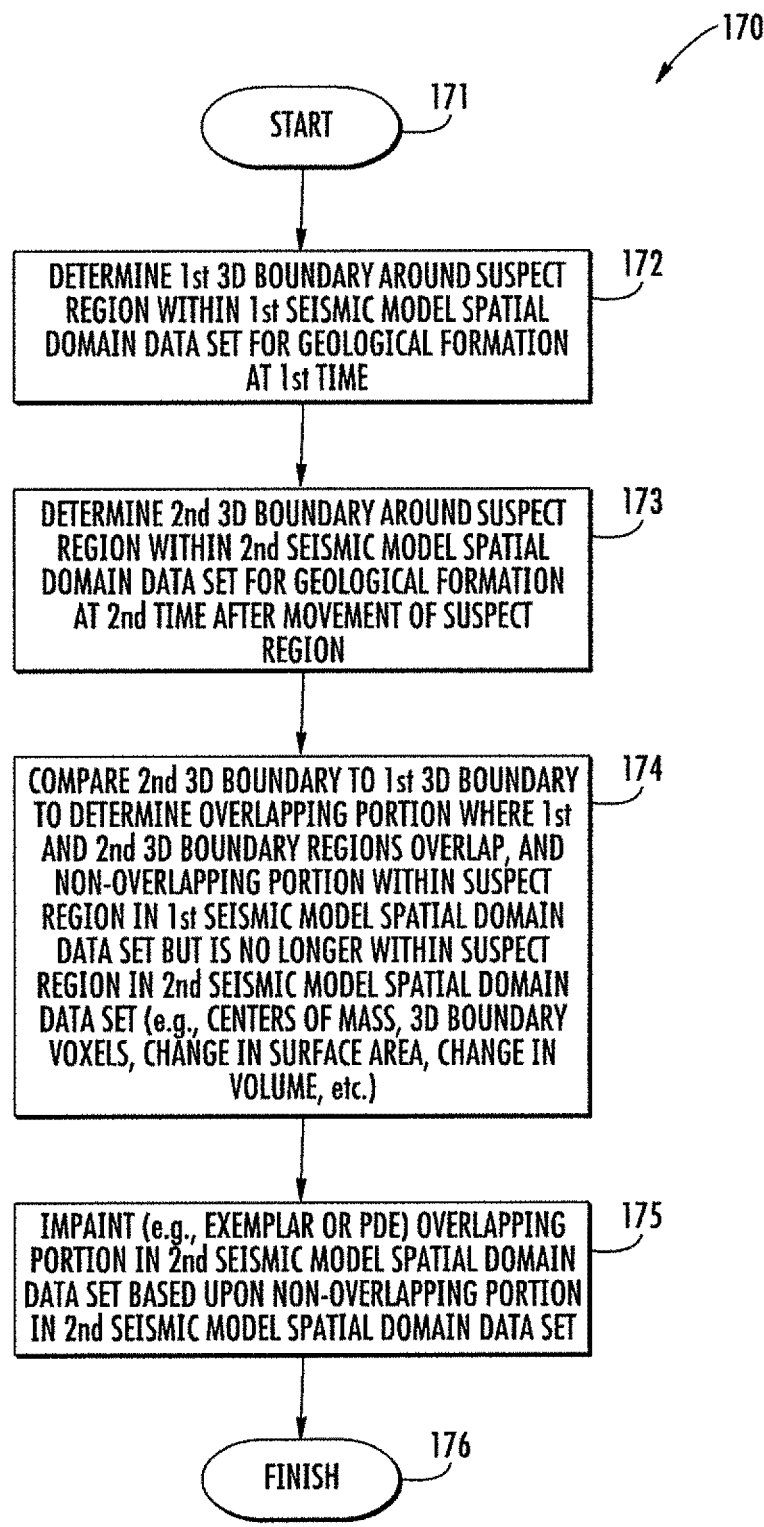
FIG. 17 is a flow diagram illustrating method aspects associated with the system of FIG. 15.

The processor 32 may accordingly inpaint the overlapping portion OP in the second seismic model spatial domain data set 132 based upon one or both of the non-overlapping portions NOP1, NOP2 in the second seismic model spatial domain data set 132, at Block 175, which illustratively concludes the method of FIG. 17 (Block 176). In this and the above-described embodiments, the inpainted or repaired data sets may be stored and subsequently viewed on a display screen or printed for further analysis as desired.

The non-overlapping portion NOP2 need not be inpainted, as the corresponding "truth" data from the first data set 130 may be substituted for the void or missing data that is present in the second data set 132. Yet, the truth data from one or both of the non-overlapping portions NOP1, NOP2 may advantageously be used to train the inpainting of the overlapping portion OP to provide improved accuracy.

For the present example, the above-described exemplar inpainting method with Poisson Merging may be used for inpainting the void in the overlapping portion OP, although a PDE-based approach (or a combination of the two) may also be used. Initially, the suspect region 131 may be inpainted in the first data set 130 using initial starting parameters, and the inpainted portion of the suspect region corresponding to the non-overlapping portion NOP1 may be considered as sample set for the following discussion. With the sample set filled, the error may be calculated with respect to the truth data. For each void (sample), an error value is calculated and recorded. The standard RMSE between the truth data (i.e., the non-overlapping portion NOP1 of the data set 132), and the results of the candidate fill algorithm is calculated. This is computed on a void by void basis, resulting in a unique error for each void. This compilation forms an error report.

To properly predict error for new samples, it is generally desirable to examine the characteristics of the voids. Moreover, a good set of description metrics that may be used for this purpose may be defined. The goal for these metrics is to predictively model the variation in the difference between the fill results and the truth data (i.e., the error). The collection of metrics may be calculated for the void(s) in the sample set. The output may be a report detailing these calculated metric values on a void by void basis.

Given a relatively large collection of available metrics, there is a good chance that many of them may not be needed for prediction. That is, there may be elements that contain redundant information, which is indicated by a high degree of mutual correlation. The other types of metrics that may be eliminated from the set are those that are found to not contain enough relevant information for the task of prediction (i.e., those whose values tell nothing about the expected output which, in this case, is error). To guard against metrics in the former category—those with redundant information—correlation analysis may be used. Metrics are grouped with others where overlap may occur. To determine the amount of redundancy, metrics may be tested against each other to determine their correlation. Those that are highly correlated may remain in a group together. Those that are not may be safely separated. The metric that best correlates with the error may taken from each group.

A statistical test may be used to determine which metrics fall into the second category mentioned above—those that do not contribute to the prediction—to prevent them from being placed into the final metrics subset. To accomplish this, hypothesis testing may be performed, as detailed below. A linear regression may be run with the full subset of candidate metrics to define the prediction model that would result if this were the final metrics subset. From this regression, each metric receives a coefficient value that describes the relationship between it and the value being predicted (in this case, error). Next, a hypothesis is determined that will allow the elimination metrics. More specifically, for each metric it is hypothesized that its coefficient value is actually zero (i.e., no relationship exists, and it is therefore useless in prediction). This allows use of the sample set of data to test the likelihood that the calculated coefficient could have been attained if the hypothesis were true. If the metric corresponding to the coefficient in question is significant, there will be a low probability that the calculated coefficient value would have occurred by chance. Following a standard statistical threshold for any metric with a value below 5%, the hypothesis is rejected and the metric is considered significant for prediction. In this fashion, metrics are removed one at a time. This iterative removal may be desirable because the interactions between metrics change as they are added and removed.

The prediction model may be independently validated on a set of data that is separate from trained system data in order to properly assess the model's ability to predict. To accomplish this, the selected sample data set with corresponding truth data are split into a training set and a validation set with no overlap between them. Each sample (void) is examined from the selected cells with all required information being recorded. These recorded entries are the actual values that are split and recorded in the separate sets.

Figure 18:
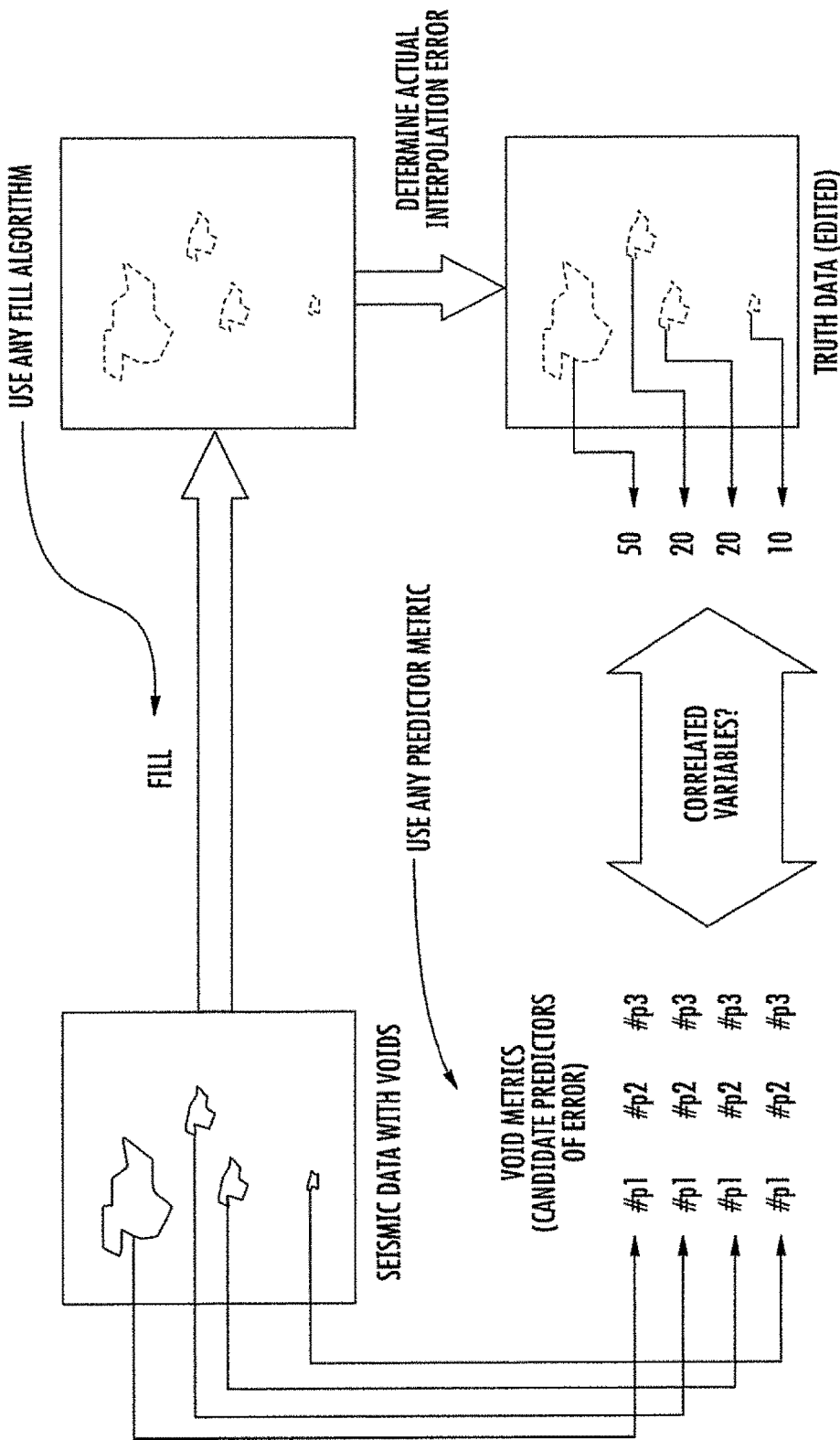
FIG. 18 is a schematic diagram illustrating predictive error concept analysis and calibration operations which may be performed by the system of FIG. 15 with the use of reference or truth data.

A good representation of the collection of voids is desirably presented to the statistical prediction model. This requires that there be a sufficient amount of sample voids with some form of corresponding truth data available. This set of truth data is split into two parts: the training set and the validation set. This training dataset may now be used to find the optimal (or near optimal) values for the parameters that make up the statistical prediction system, a process known as training the system. FIG. 18 shows this process visually.

More particularly, the value of the void fill depends on how accurately the fill estimates or approximates truth (i.e., reference) data for the void region. The computation of the accuracy of void fill may not be possible where void fill techniques are used that do not require truth data for the void regions. However, an error associated with the void fill may be estimated based on prior knowledge of how the given technique performs with voids where truth data is available.

Moreover, to build a model for estimating the error in a void fill, void complexity predictor metrics may first be defined based on characteristics of the void perimeter. These metrics may include a variety of measures of the complexity of the void. One example of a void complexity predictor metric is a measurement of the frequency of the data surrounding the void.

Figure 19:
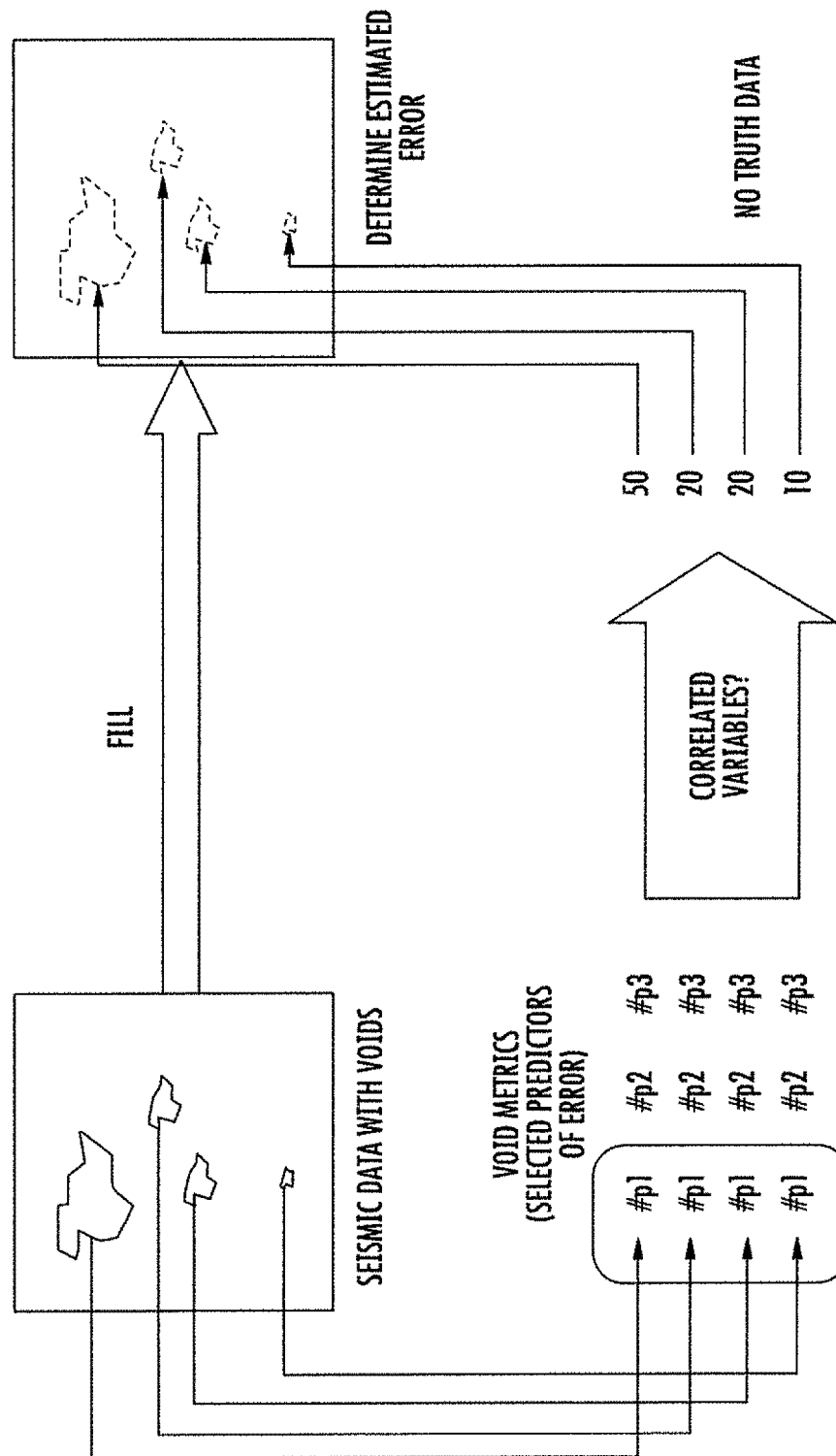
FIG. 19 is a schematic block diagram illustrating inpainting after the calibration operations shown in FIG. 18 and without truth data.

A training phase is defined where data is collected for a suite of void complexity predictor metrics for each void. The predictors may then be statistically correlated and calibrated using truth data to determine which are the best predictors of fill accuracy, as shown in FIG. 18. The calibrated predictors are then used for estimating the accuracy of fills for fill regions without truth data, as shown in FIG. 19, which illustrates the fill predictive (bounded) error concept application to a cell with no truth data, i.e., the overlapping portion OP in the present example.

Using the training set described above, a form of linear regression analysis may be performed to fit the prediction model to the population of voids. To do this, the set of the best description metrics available (those left after the iterative removal process previously discussed) may be combined to create a linear prediction equation. The performance of this method during validation (described below) determines if this statistical method may properly describe the current problem domain or if another method should be used.

The goal of this step, regardless of the form of the prediction equation used, is to determine the coefficients of each parameter present. There is one parameter each per selected metric in the linear model, and these coefficients model the relationship between the metrics and the error. These optimal coefficients minimize a certain residual between the predicted fill error and the actual fill error for the given training set in the given model. With the foregoing in place, error may now be predicted for any new void sample for which the same selected metric values can be calculated Validation provides a way to assess the performance of the newly created model before applying it to the full application data set that has no corresponding truth data. As previously mentioned, this process is performed on a separate validation set that is not included during the training process. To validate the model, each sample in the validation set may be evaluated using the prediction model to produce a predicted error for each void. Along with this, confidence intervals may be calculated to further enhance the information contained in this calculation. The difference between the predicted value and the true error for the sample gives the error residual. The better the prediction model, the lower these values will be.

If these residual values indicate that the model does not sufficiently fit the true behavior of the current problem domain, then a change is appropriate. Once an acceptable model is generated and validated, it is ready for use in prediction of fill results for the full application data set. At this point, the validation dataset is used to test the performance of the current model. Since truth data is available, an analysis may be made to determine how closely the model successfully predicted the true error of the fill. Finally, with the model trained and validated, the error that will occur in filling new samples without truth data may be predicted. Typically, these types of predictions may include some form of confidence information along with the expected value. The training and validation operations are illustrated in FIG. 19.

A description of an example set of selected metrics set is now provided. These metrics and their corresponding beta values resulted from applying the described methodology on a selected set of training data and candidate metrics. The selection of these metrics, from the original list of metrics considered, is based on the statistics of the void data. The statistical analysis process not only selected this set of predictors, but also determined the number of predictors to use (i.e., the system need not be asked for the top seven predictors, but rather for an optimal set under the current method) based on iterative analysis of the training results. In this example configuration, the selected metrics are based on the following: (1) average void diameter; (2) average impedance and slope differences on opposite sides of the void; (3) average impedance and slope differences on adjacent void posts; and (4) maximum impedance difference on void boundary for opposite and adjacent points. These metrics and their corresponding beta values resulted from applying the described methodology to the selected set of training data and candidate metrics. The predictive model that incorporates these metrics is a multiple regression that has the following form:

$$\text{Predicted Error} = \beta_1 * X_1 + \beta_2 * X_2 + \ldots + \beta_7 * X_7 + \text{Error Intercept}.$$

The values of $\beta$ (and the error intercept) are the model coefficients obtained from the training and validation data sets, and the values of X are the corresponding metrics. These are the subset of metrics selected from an original collection of approximately fifty metrics. The selection of these metrics is based on the statistics of the void data. The statistical analysis process not only selected this set of predictors, but also determined the number of predictors to use based on the iterative analysis of the training results. The selected predictors are as follows:

X1=Grid Avg Distance: For each point adjacent to a void (boundary point), accumulate distance across the void in each primary direction and divide by total number of such distances.

X2=Grid Stat: similar to the previous predictor, compute average distance and average impedance difference between points across void and sum the two averages.

X3=Avg Dir Range: for each void boundary post, maintain a Max and Min neighbor elevation difference for each direction (8 possible directions, direction 0=north). Compute average Max[dir]−Min[dir] of the pairs of stored values. Compute impedance difference between blue post, and each neighbor, saving the value if a new maximum or minimum value is found. After processing all boundary posts, average the difference in the pairs of Max and Min values.

X4=Slope Change %: order the boundary posts in a contiguous clockwise fashion around the void. Compute impedance change between consecutive posts. When consecutive impedance changes differ by more than 50% of grid spacing, increment a counter. After processing all impedance change pairs, divide by number of boundary posts.

X5=Avg Opposite Slope: order the 'n' boundary posts in a contiguous fashion. for first n/2 points, accumulate slope between point(i) and point(i+n/2). Divide by n/2 for average.

X6=Max Opposite Delta: order the 'n' boundary posts in a contiguous fashion. For first n/2 points, find maximum impedance difference between point(i) and point (i+n/2).

X7=Elevation Extent: find the highest and lowest boundary post values. Subtract lowest from highest to get the elevation extent.

Further details regarding this approach may be found in Yates et al., "Void Fill Accuracy Measurement and Prediction Using Linear Regression", ASPRS 2012 Annual Conference, March 2012, which is hereby incorporated herein in its entirety by reference.

The above-described boundary tracking approach advantageous provides for progressive predictive analtic precision, in that the boundary motion tracking enables retrospective model validation with new truth data. Moreover, this approach may be implemented using general purpose computing on graphics processing units (GPGPU) to provide real or substantially real time 3D processing, along with the ability to work with relatively large and complex seismic data sets. As such, this may provide a predictive framework to enhance resource (e.g., oil and gas) production based upon changes between subsequent measurements.

Additional background on the above-described techniques may be found in U.S. Pat. No. 7,760,913 to Rahmes et al.; U.S. Pat. No. 7,750,902 to Rahmes et al.; U.S. Pat. No. 7,764,810 to Rahmes et al.; U.S. Pat. No. 7,391,899 to Rahmes et al.; U.S. Pat. No. 7,528,938 to Garceau et al; U.S. Pat. No. 7,603,208 to Garceau et al.; and U.S. Pat. No. 8,855,427 to Yates et al., which are assigned to the present Assignee and are all hereby incorporated herein in their entireties by reference.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A seismic modeling system comprising:
a seismic model data storage device; and
a processor cooperating with said seismic model data storage device to
transform a seismic model spatial domain data set associated with a given region into a seismic frequency domain data set, the given region including a suspect region, transform a seismic model spatial domain data subset associated with the suspect region into a seismic frequency domain data subset,
perform inpainting of the seismic frequency domain data subset based upon the seismic frequency domain data set,
convert the inpainted seismic frequency domain data subset into an inpainted spatial domain data subset,
substitute the inpainted spatial domain data subset for the seismic model spatial domain data subset associated with the suspect region in the seismic model spatial domain data set associated with the given region to generate an inpainted seismic model spatial domain data set, and
store the inpainted seismic model spatial domain data set in the seismic model data storage device.

2. The seismic modeling system of claim 1 wherein the seismic model spatial domain data set comprises a compressional wave data set.

3. The seismic modeling system of claim 1 wherein said processor substitutes the inpainted spatial domain data set based upon a vertical correlation compensation.

4. The seismic modeling system of claim 1 wherein said processor inpaints based upon an exemplar inpainting algorithm.

5. The seismic modeling system of claim 1 wherein said processor inpaints by propagating contour data along a direction of lines of constant contour from adjacent portions of the seismic frequency domain data set into the seismic frequency domain data subset.

6. The seismic modeling system of claim 5 wherein the contour data comprises at least one of phase and amplitude data.

7. The seismic modeling system of claim 5 wherein said processor iteratively propagates the contour data into the seismic frequency domain data subset.

8. The seismic modeling system of claim 1 wherein said processor performs inpainting based upon at least one turbulent fluid flow modeling equation.

9. The seismic modeling system of claim 8 wherein the at least one turbulent fluid flow modeling equation comprises at least one Navier-Stokes equation.

10. The seismic modeling system of claim 1 comprising a seismic source and at least one seismic transducer cooperating therewith to generate the seismic frequency domain data set.

11. A seismic modeling system comprising:
a seismic model data storage device; and
a processor cooperating with said seismic model data storage device to
transform a seismic model spatial domain data set associated with a given region into a seismic frequency domain data set, the given region including a suspect region, and the seismic model spatial domain data set comprising a compressional wave data set,
transform a seismic model spatial domain data subset associated with the suspect region into a seismic frequency domain data subset,
perform inpainting of the seismic frequency domain data subset based upon the seismic frequency domain data set,
convert the inpainted seismic frequency domain data subset into an inpainted spatial domain data subset,
substitute the inpainted spatial domain data subset for the seismic model spatial domain data subset associated with the suspect region in the seismic model spatial domain data set associated with the given region based upon a vertical correlation compensation to generate an inpainted seismic model spatial domain data set, and
store the inpainted seismic model spatial domain data set in the seismic model data storage device.

12. The seismic modeling system of claim 11 wherein said processor inpaints based upon an exemplar inpainting algorithm.

13. The seismic modeling system of claim 11 wherein said processor inpaints by propagating contour data along a direction of lines of constant contour from adjacent portions of the seismic frequency domain data set into the seismic frequency domain data subset.

14. The seismic modeling system of claim 11 comprising a seismic source and at least one seismic transducer cooperating therewith to generate the seismic frequency domain data set.

15. A seismic modeling method comprising:
using a processor and an associated seismic model data storage device to
transform a seismic model spatial domain data set associated with a given region into a seismic frequency domain data set, the given region including a suspect region,
transform a seismic model spatial domain data subset associated with the suspect region into a seismic frequency domain data subset,
perform inpainting of the seismic frequency domain data subset based upon the seismic frequency domain data set,
convert the inpainted seismic frequency domain data subset into an inpainted spatial domain data subset, and
substitute the inpainted spatial domain data subset for the seismic model spatial domain data subset associated with the suspect region in the seismic model spatial domain data set associated with the given region to generate an inpainted seismic model spatial domain data set, and
store the inpainted seismic model spatial domain data set in the seismic model data storage device.

16. The method of claim 15 wherein the seismic model spatial domain data set comprises a compressional wave data set.

17. The method of claim 15 wherein the processor substitutes the inpainted spatial domain data set based upon a vertical correlation compensation.

18. The method of claim 15 wherein the processor inpaints based upon an exemplar inpainting algorithm.

19. The method of claim 15 wherein the processor inpaints by propagating contour data along a direction of lines of constant contour from adjacent portions of the seismic frequency domain data set into the seismic frequency domain data subset.

20. The method of claim 15 comprising using a seismic source and at least one seismic transducer cooperating therewith to generate the seismic frequency domain data set.

21. A non-transitory computer-readable medium having computer-executable instructions for causing a computer, comprising a processor and an associated seismic model data storage device, to perform steps comprising:
transforming a seismic model spatial domain data set associated with a given region into a seismic frequency domain data set, the given region including a suspect region;

transforming a seismic model spatial domain data subset associated with the suspect region into a seismic frequency domain data subset;

inpainting the seismic frequency domain data subset based upon the seismic frequency domain data set;

converting the inpainted seismic frequency domain data subset into an inpainted spatial domain data subset;

substituting the inpainted spatial domain data subset for the seismic model spatial domain data subset associated with the suspect region in the seismic model spatial domain data set associated with the given region to generate an inpainted seismic model spatial domain data set, and storing the inpainted seismic model spatial domain data set in the seismic model data storage device.

22. The non-transitory computer-readable medium of claim 21 wherein the seismic model spatial domain data set comprises a compressional wave data set.

23. The non-transitory computer-readable medium of claim 21 wherein substituting comprises substituting the inpainted spatial domain data set based upon a vertical correlation compensation.

24. The non-transitory computer-readable medium of claim 21 wherein inpainting comprises inpainting based upon an exemplar inpainting algorithm.

25. The non-transitory computer-readable medium of claim 21 wherein inpainting comprises inpainting by propagating contour data along a direction of lines of constant contour from adjacent portions of the seismic frequency domain data set into the seismic frequency domain data subset.

26. The non-transitory computer-readable medium of claim 21 wherein the seismic model spatial domain data set is generated by a seismic source and at least one seismic transducer cooperating therewith.

* * * * *